United States Patent [19]
Klimt

[11] Patent Number: 4,921,077
[45] Date of Patent: May 1, 1990

[54] INWARDLY STRADDLING DISC BRAKE, IN PARTICULAR FOR AUTOMOTIVE VEHICLES

[75] Inventor: Ulrich Klimt, Muehltal, Fed. Rep. of Germany

[73] Assignee: Alfred Teves GmbH, Frankfurt am Main, Fed. Rep. of Germany

[21] Appl. No.: 928,316

[22] Filed: Nov. 7, 1986

[30] Foreign Application Priority Data

Nov. 8, 1985 [DE] Fed. Rep. of Germany ....... 3539602

[51] Int. Cl.$^5$ ............................................. F16D 65/02
[52] U.S. Cl. ................................. 188/73.45; 188/71.1;
188/72.4; 188/73.39; 188/370
[58] Field of Search ............... 188/73.31, 73.39, 73.45,
188/71.1, 72.4, 368, 369, 370

[56] References Cited

U.S. PATENT DOCUMENTS

| | | |
|---|---|---|
| 3,447,646 | 6/1969 | Pace . |
| 4,084,666 | 4/1978 | Karasudani ..................... 188/73.45 |
| 4,219,106 | 2/1980 | Lupertz et al. .................. 188/73.39 |
| 4,220,224 | 9/1980 | Karasudani ..................... 188/73.39 |
| 4,485,897 | 12/1984 | Kawaguchi et al. ........ 188/73.31 X |

FOREIGN PATENT DOCUMENTS

| | | |
|---|---|---|
| 139896 | 5/1985 | European Pat. Off. . |
| 1755391 | 8/1971 | Fed. Rep. of Germany . |
| 8422260 | 6/1985 | Fed. Rep. of Germany . |
| 3508039 | 1/1986 | Fed. Rep. of Germany . |
| 1050059 | 12/1966 | United Kingdom . |

OTHER PUBLICATIONS

2106603 04/13/83 U.K. Application.

Primary Examiner—Andres Kashnikow
Assistant Examiner—M. L. Graham
Attorney, Agent, or Firm—Robert P. Seitter

[57] ABSTRACT

An inwardly straddling disc brake in particular for automotive vehicles is disclosed including a brake disc carried at its outer rim, a stationary brake support having two substantially radially extending arms which are interconnected by a connecting portion extending substantially in a circumferential direction and a brake housing which is axially slidably supported at the brake support member and actuable by means of an actuating means and which embraces the inner rim of the brake disc. Two radially extending legs and a substantially axially extending bridge portion connect the two legs. A first brake pad is disposed and supported on one side of the brake disc, in particular in the brake support member and to which pressure can be applied directly by the actuating means. A second brake pad is disposed and supported on the other side of the brake disc, in particular on the brake housing and which can be applied by the respective leg of the housing. To reduce the mounting space required by the brake support member the connecting portion is disposed within the opening formed by the radially extending legs and the bridge portion of the brake housing.

3 Claims, 2 Drawing Sheets

INWARDLY STRADDLING DISC BRAKE, IN PARTICULAR FOR AUTOMOTIVE VEHICLES

BACKGROUND OF THE INVENTION:

The present invention is concerned with an inwardly straddling type disc brake, in particular for automotive vehicles, including a brake disc carried at its outer rim, a stationary brake support member having two substantially radially extending arms which are interconnected by a connecting portion extending substantially in a circumferential direction, and a brake housing which is axially slidably supported at the brake support member. The brake housing is actuable by an actuating device and embraces the inner rim of the brake disc. The housing includes two radially extending legs and a substantially axially extending bridge portion connecting the two radial legs. A first brake pad is disposed and supported on one side of the brake disc, in particular in the brake support member. Pressure applied directly to the first pad by the actuating means. A second brake pad is disposed and supported on the other side of the brake disc, in particular on the brake housing, and which is acted upon by a respective one of the radial legs of the housing.

A disc brake of this type is disclosed in the pending U.S. patent application Ser. No. 759,402. In that particular disc brake, the connecting portion of the support member is disposed between the two radially extending arms of the brake support member radially outwardly, that is, above the radial leg of the brake housing which includes the actuating means. A shortcoming of that arrangement lies in that a relatively large mounting space is required in the supporting zone in the radial direction. In applications where such mounting space is not available, the brake disc diameter must be reduced accordingly thereby sacrificing the advantages of the inwardly straddling type construction and in particular the large brake disc diameter afforded by such construction.

SUMMARY OF THE INVENTION

It is, therefore, an object of the present invention to provide for an inwardly straddling type disc brake in which the space required in the radial direction for the brake support is minimized.

According to the invention the connecting portion of the support member is disposed within the opening formed by the two radially extending legs and the bridge portion of the brake housing. Accordingly, there are no components protruding radially beyond the brake housing and the outermost contour, in the radial direction, is determined solely by the brake housing itself. Advantageously the brake disc diameter can be of a of relatively large diameter without encountering lack of space in the brake support zone. Accordingly the thermal load on the brake disc is substantially reduced and the brake disc strength is significantly increased. Also, the brake pads can be of greater height resulting in greater pad friction face area. A further advantage of the invention is that by increasing the effective radius, the actuating piston diameter can be reduced, because lower tensile stresses will be encountered. Also, the stress to which the support member is exposed, in general, will be more favorable so that it can be of a less weighty design. The transition from the bridge portion to the radial legs of the brake housing can be more favorably configured due to less deflection of the housing.

According to a preferred embodiment of the invention, the connecting portion of the support member as viewed in the axial direction is disposed in the area of the bridge portion of the brake housing. To lead the bridge portion as closely as possible along the inner circumference of the brake disc, the invention provides a corresponding recess in the bridge portion in which the connecting portion of the brake support member is at least partially disposed.

According to another feature of the invention the connecting portion of the brake support member, toward the axis of the brake disc, is provided with curved configuration.

The invention will be better understood after reaching the following Detailed Description Of The Preferred Embodiment in conjunction with drawing wherein.

DETAILED DESCRIPTION OF THE PREFERRED EMBODIMENT

Figure 1:
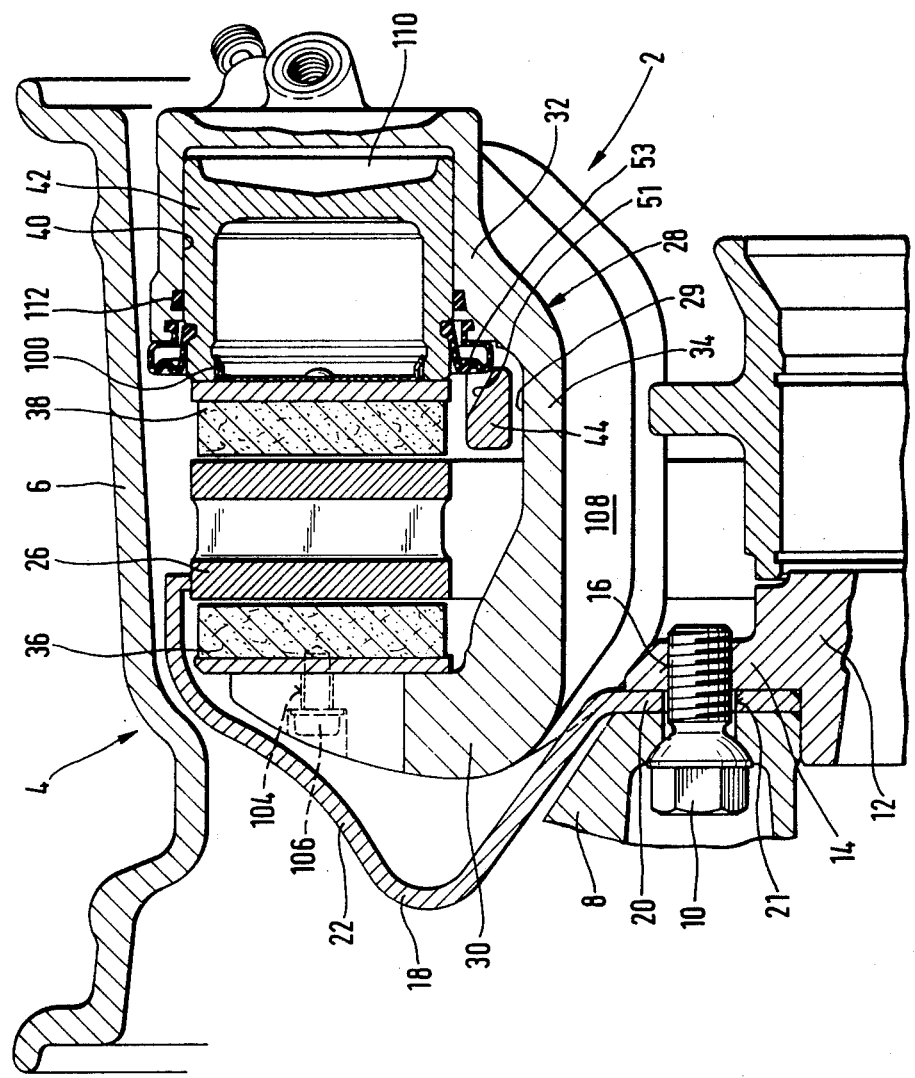
FIG. 1 is a longitudinal section through an inwardly straddling disc brake and a portion of vehicle wheel showing details of construction.

In the drawing, an inwardly straddling disc brake arrangement 2 is shown mounted in a vehicle wheel 4. Only the rim 6 and a portion of the wheel dish 8 of the wheel are illustrated. The wheel dish 8 of the wheel 4 is secured to a wheel bearing housing 12 by means of bolts 10. The vehicle wheel 4, is rotatably mounted on an axle spindle by means of a bearing (not shown) mounted in the wheel bearing housing 12. For that purpose, the wheel bearing housing 12 includes a flange 14 in which are provided tapped holes 16 into which the bolts 10 are threaded. Along with the bolts 10 there is a brake disc support member 18 secured to the flange 14, with the brake disc support member 18 being disposed between the flange 14 and the wheel dish 8. The brake disc support member 18 includes a substantially circular securing portion 20 disposed radially internally, in which securing portion apertures 21 are provided and through which the bolts 10 pass. A support member 22 conforms to the contour of the wheel dish 8. The support member 22 forms an end section extending in manner substantially axially parallel and joins to a friction ring 26 forming the actual brake disc. The disc brake 2 embracing the ring 26 includes a brake housing 28 which, in longitudinal section, is of a substantially U-shaped configuration and includes two radially outwardly extending legs 30, 32 interconnected by a bridge portion 34. Disposed on either side of the friction ring 26 are brake pads 36, 38 that are embraced by the U-shaped brake housing 28. For applying the disc brake, the internally disposed leg 32 includes a cylindrical bore 40 receiving an axially displaceable piston 42. The piston 42 applies pressure directly to the internally disposed brake pad 38 thereby oppositely displacing, in response thereto, the brake housing 28 to the inside which applies pressure to the outwardly disposed brake pad 36.

Figure 2:
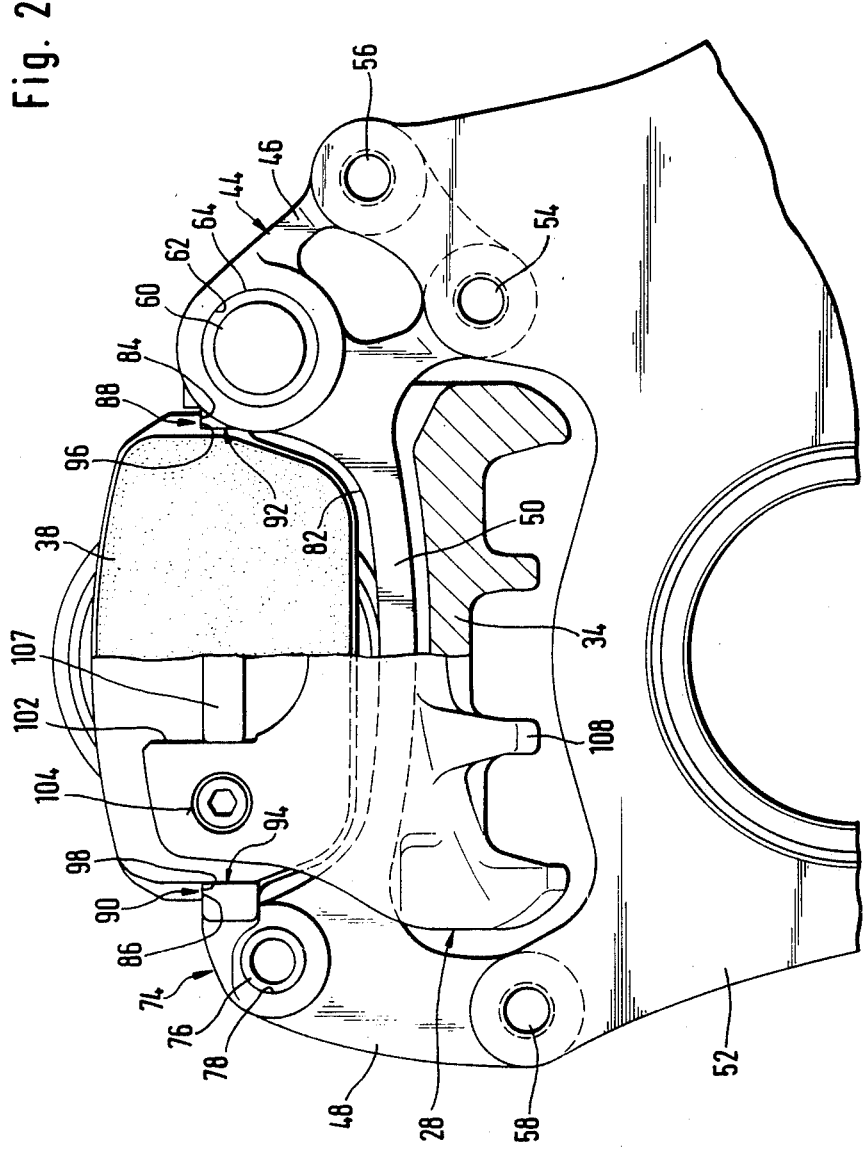
FIG. 2 is a partial cross sectional view of the inner side of the disc brake of FIG. 1 showing further details of construction.

As shown in the drawing, the brake housing 28 is supported in axially displaceable manner on a stationary brake support member 44. The brake support member 44 includes two brake support arms 46, 48 extending substantially radially outwardly and being interconnected by a connecting portion or a connecting stem 50 such that the brake support member 44, generally, is of an approximately H-shaped configuration as shown in FIG. 2. The connecting portion 50 is disposed within the U-shaped recess formed by the brake housing 28 between the bridge portion 34 and the internal brake pad 38. The bridge portion 34, for this purpose, includes an indentation or recess 29 so that there is ample space for an adequately dimensioned connecting portion 50. In the area of the actuating means, the connecting portion 50 is provided with a recess 51 so that there is room for a protective sleeve 53 secured to the piston. The connecting portion 50 is bent toward the center of the brake disc and preferably is disposed in substantially the same plane as the brake support arms 46, 48. However, given predetermined mounting conditions, it can also be advantageous to have the brake support arms 46, 48 cantilevered from the connecting portion 50.

The brake support member 44 is connected to a stub axle 52 and, for that purpose, includes three securing points. These securing points are in the form of holes 54, 56 and 58 provided in the brake support member 44, with two ports 54, 56 being provided on the brake support arm 46 which, as viewed in the direction of the main rotation the holes 54, 56 are disposed on the disc inlet side, and the third hole 58 is provided on the brake support arm 48 disposed on the disc outlet side. The internally disposed port 54 on the brake support arm 46, is disposed substantially on the same radius as the bore 58 on the disc outlet-side of the brake support arm 48. Holes corresponding to holes 54, 56, 58 provided in the brake support member 44, are provided in the stub axle 52 so that the brake support member 44 can be connected to the stub axle 52 by means of bolts (not shown). For disposing the brake housing 28 in axially displaceable manner on the brake support member 44, a support bolt 60 is provided which is rigidly disposed in a hole 62 of the brake support member 44, with the hole 62 being provided in the brake support arm 46 on the disc inlet side as viewed in the main direction of the rotation. The support bolt 60 forms a free end protruding from the bore 62 and extends away from the brake disc, which free end has a guide face 64 cooperating with a guide port provided in the brake housing 28.

Means 74 is provided on the disc outlet side, as viewed in the main direction of rotation, to receive the moments occurring during braking about the support bolt 60. The means 74 includes a short-length bolt 76 screwed or pressed into the brake support arm 48 and extending away from the brake disc parallel to the support bolt 60. The bolt 76 is received in a hole 78 provided in the brake housing 28, with the diameters of the port 78 and of the bolt 76 being so dimensioned as to leave therebetween a free annular chamber. Seated in the annular chamber is a rubber sleeve which attenuates the movements of the hollow bolt 76 which occur during braking. Other attenuating elements made of different materials and having attenuating properties, can be provided.

To support the internally disposed brake pad 38 in the brake support member 44, the support member 44 forms an approximately U-shaped recess 82 which, at its bottom side, is confined by the connecting portion 50 and, laterally, by the radially outer portions of the brake support arms 46, 48. Provided above the axes of the support bolt 60 and bolt 76 at the brake support arms 46, 48, are lugs 84, 86 which form supporting faces 88, 90 extending in the circumferential direction, and substantially radially extending supporting faces 92, 94 for the internal brake pad 38. The internal brake pad 38 is provided with corresponding complementary lugs 96, 98. For supporting the internally disposed brake pad 38 in the radial direction, the internal pad is provided with resilient tongues 100 engaging the interior of the piston 42. For supporting the externally disposed brake pad 36 on the outer leg 30 of the housing 28, the leg 30 is provided with a U-shaped recess 102, including two holes 104 (of which only one is shown) through which bolts 106 pass. The bolts 106 that are screwed into the brake pad 36. The recess 102 also serves to support the outer brake pad 36 which in that area includes a supporting and reinforcing bar 107. The brake pads 36, 38, can be easily radially inserted from the outside. To install the pads, the brake housing 28 is first displaced to the inside (to the right in FIG. 1) allowing insertion of the inner brake pad 38. Subsequently, the brake housing 28 is displaced outwardly (to the left in FIG. 1) to thereby enable the outer pad 36 to be inserted into the brake housing 28 through openings (not shown) provided in the brake disc support member 18 eliminating the need for the brake disc 26 to be dissembled for the purpose of replacing the pad. The openings in the brake disc support member 18, can be so configured that fastening the outer brake pad 36 and the brake housing 28 can also be performed through the opening.

The brake housing 28, in the area of the bridge portion 34 and of the radially internally disposed portion of legs 30, 32, is provided with ribs 108. The brake housing 28, in the areas exposed to a particularly high stress, is thereby given an increased cross-section.

The operation of the inwardly straddling disc brake will now be briefly described. For applying the disc brake 2, a pressure fluid is introduced into the cylindrical chamber 110 by a connection thereby axially displacing the piston 42 toward the brake disc 26. The piston thereby applies pressure to the internally disposed brake pad 38 urging the same against the brake disc 26. In response thereto, the brake housing 28 is displaced inwardly, i.e., to the right in FIG. 1, forcing the outer brake pad 36 against the brake disc 26. When releasing the brake, the fluid in the cylindrical chamber 110 will become non-pressurized thereby returning piston 42 to some amount to the cylindrical bore with the aid of a roll-back seal 112 thereby catching the inner brake pad 38.

What is claimed is:

1. An inwardly straddling disc brake for automotive vehicles, comprising a brake disc supported at an outer rim thereof, a stationary generally H-shaped brake support member having two substantially radially extending arms interconnected intermediate their ends by a connecting portion extending substantially in a circumferential direction of the disc, the radially inner ends of the arms having means for mounting the brake support member on the automotive vehicle, a brake housing which is axialy slideably supported adjacent the radially outer ends of the arms, an actuating device for actuating said brake housing, said brake housing includes two radially extending legs and a substantially axially extending bridge portion connecting said two legs, a first brake pad disposed and supported on one of the legs adjacent one side of the brake disc so that pressure can be applied directly by the actuating device, a second brake pad disposed and supported on the other one of the legs adjacent a second side of the brake disc so that it can be applied by the other one of said two legs, said connecting portion of said bridge portion being disposed on the radially inner side of the connecting portion of said brake support member within an opening formed by the connecting portion of said brake support member and the sections of the arms extending radially inwardly therefrom.

2. An inwardly straddling disc brake according to claim 1, wherein the connecting portion is curved toward the brake disc axis.

3. An inwardly straddling disc brake according to claim 1, wherein a recess is formed by the connecting portion and the sections of the arms extending radially outward therefrom, the connecting portion being located radially inwardly of the brake disc and brake pads whereby the recess receives the brake pads.

* * * * *